J. E. HURLEY.
GLASS TANK FURNACE.
APPLICATION FILED JUNE 15, 1920.
1,390,614.
Patented Sept. 13, 1921.
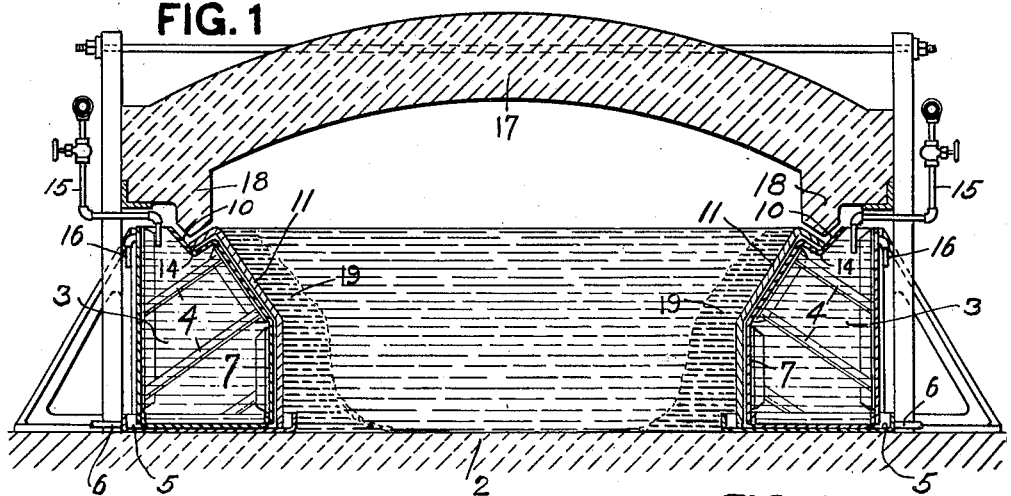
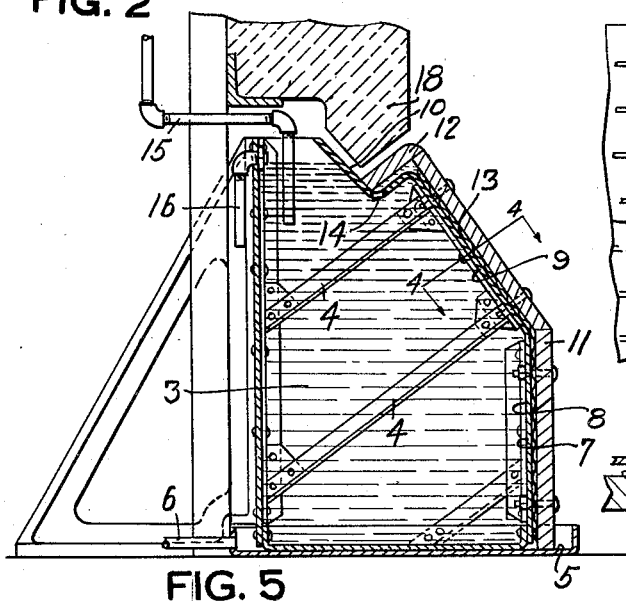
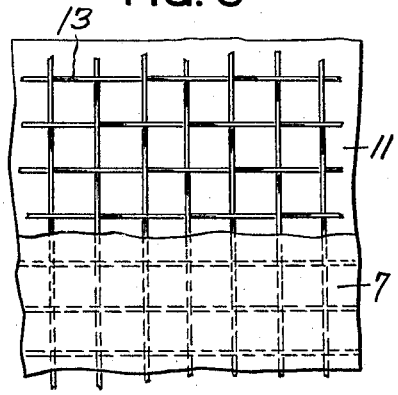
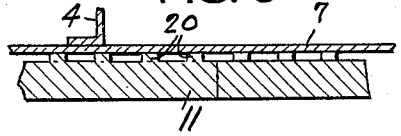

UNITED STATES PATENT OFFICE.

JOSEPH E. HURLEY, OF JEANNETTE, PENNSYLVANIA.

GLASS-TANK FURNACE.

1,390,614.  Specification of Letters Patent.  Patented Sept. 13, 1921.

Application filed June 15, 1920. Serial No. 389,191.

*To all whom it may concern:*

Be it known that I, JOSEPH E. HURLEY, a citizen of the United States, and resident of Jeannette, in the county of Westmoreland and State of Pennsylvania, have invented a new and useful Improvement in Glass-Tank Furnaces; and I do hereby declare the following to be a full, clear, and exact description thereof.

My invention relates to glass tank furnaces.

In a patent granted to A. O. Hurley on the 20th day of June, 1905, No. 792,705 there is illustrated and described a glass tank furnace in which the walls of the furnace consist of water tanks with a wooden facing, and a trough at the top of the tank, the idea being that the glass adjacent to the tank will become chilled, forming a layer of chilled glass along the sides of the furnace and the molten glass flowing into the trough will act as a seal and at the same time will tend to bind or lock the layer of chilled glass extending down along the sides of the tank and prevent its slipping down. The result is that the hot molten glass does not have an opportunity to reach the walls of the furnace, but is held within a receptacle, as it were, of chilled glass, as there is generally a layer of semifluid or partially solid glass on the bottom of these furnaces due to the chilling action of the bottom.

The object of the present invention is to give further protection to the walls of a furnace of this character and to these ends the invention consists generally stated in providing for the circulation of the cooling medium between the walls of the tank and the wooden facing, all as more fully hereinafter set forth and claimed.

In the accompanying drawing, Figure 1 is a cross section of a glass melting furnace of the type above described, showing my invention applied thereto; Fig. 2 is an enlarged cross sectional view of the tank; Fig. 3 is a view partially broken away of the wall showing the wire mesh which forms the space for the circulation of the water; Fig. 4 is an enlarged section on the line 4—4, Fig. 2; and Figs. 5 and 6 show modified forms of my invention.

In the drawings, the numeral 2 designates suitable floor or foundation for the furnace, and on this floor are erected the tanks 3 which form the side walls of the furnace. These tanks are composed of metal plates riveted together, and braced within by the angle-bars 4. The tanks rest in pans 5 to receive the water coming from the tank, and this water may be drained off by suitable outlet 6.

The inner plates 7 of the tank are preferably formed with the lower vertical portions 8, the outwardly inclined portions 9, and at the top the plates are bent to form the trough 10.

Bolted or otherwise secured to the plates 7 is the wooden or other fibrous lining 11, a portion of which 12, also extends into the trough 10. Interposed between the wooden lining 11 and the plate 7 is a suitable spacing material 13 to form a water-passage between said wooden lining and said plates. This spacing material may be formed of wire mesh, such as shown in Figs. 3 and 4, the wire mesh being slightly fluted or corrugated as shown in Fig. 4, so as to permit the free passage of water through the space between said wooden lining and said plates.

Openings 14 are provided in the plates 7 to permit the water in the tank to pass into the passage between said wooden lining and said plate 7.

Supply pipes 15 are provided to supply water to the tanks 3, and overflow pipes 16 are also provided to take care of any excess water.

The crown 17 of the furnace has the downwardly extending portion 18 which extends down into the trough 10.

When my improved furnace is in operation, the glass is melted by heat applied in any suitable manner, and the tanks 3 being filled with water, the chilling effect caused thereby will form a chilled layer 19 of glass adjacent the walls and the glass will flow up and into the trough 10 so as to form a seal against the escape of the heat. The water in the tank 3 passing through the openings 14 will flow down through the space occupied by the spacing material or wire mesh 13, and there will consequently be a constant flow of water which will add to the chilling action and at the same time will protect the wooden lining 11, and while the same may become charred or burnt, it will not be entirely consumed. Water passing down through the passage between the wooden lining to the metal plates, will collect in the pans 5 and be drained therefrom by the outlets 6.

In Figs. 5 and 6, I have illustrated a modified form of my invention in which the space between the wooden lining and the metal plates of the tank is formed by ribs 20 on the wooden lining, said ribs being arranged as shown in Fig. 5 to permit free circulation of the water.

What I claim is:

1. A glass tank furnace comprising tanks forming the walls thereof, means for supplying water to said tanks, a fibrous facing on the inner walls of said tank, and a passage formed between said walls of said tank and said facing, said passage communicating with said tank.

2. A glass tank furnace comprising tanks forming the walls thereof, means for supplying water to said tanks, a fibrous facing on the inner walls of said tanks, said facing being spaced from said walls to provide a passage and said passage communicating with said tank.

3. A glass tank furnace comprising tanks forming the walls thereof, means for supplying water to said tanks, a fibrous facing secured to the inner walls of said tank, a reticulated spacing material interposed between said facing and the inner walls, the said space forming a water passage and a communication between said tank and said passage.

4. A glass tank furnace comprising walls formed of tanks, means for supplying water to said tanks, a trough formed at the upper portion of said tanks, a fibrous facing secured to the inner walls of said tank, said facing extending into said trough, said facing being spaced from said walls to form a water passage, and openings formed in said trough communicating with said water passage.

In testimony whereof, I, the said JOSEPH E. HURLEY, have hereunto set my hand.

JOSEPH E. HURLEY.

Witnesses:
JOHN F. WILL,
J. R. KELLER.